United States Patent
Goossen et al.

(10) Patent No.: US 9,824,315 B2
(45) Date of Patent: Nov. 21, 2017

(54) RESPONSE PLANNING AND EXECUTION AIDING SYSTEM AND METHOD

(71) Applicant: HONEYWELL INTERNATIONAL INC., Morristown, NJ (US)

(72) Inventors: Emray Goossen, Albuquerque, NM (US); Derick Lucas Gerlock, Albuquerque, NM (US); Katherine Goossen, Albuquerque, NM (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 796 days.

(21) Appl. No.: 14/307,903

(22) Filed: Jun. 18, 2014

(65) Prior Publication Data

US 2015/0371136 A1 Dec. 24, 2015

(51) Int. Cl.
*G06Q 10/06* (2012.01)
*G06Q 50/30* (2012.01)

(52) U.S. Cl.
CPC .............. *G06Q 10/06* (2013.01); *G06Q 50/30* (2013.01)

(58) Field of Classification Search
CPC ............ B64C 39/024; B64C 2201/146; B64C 2201/128; B64C 2201/141; B64C 2201/145; B64C 2201/126; B64C 2201/00; B64C 2201/123; G08G 5/0069; G08G 5/0013; G08G 5/0034; G08G 5/0039; G08G 5/003; G05D 1/0088; G05D 1/0274; G05D 1/0278; G06F 17/30241; F41H 11/13; B25J 9/1666
See application file for complete search history.

(56) References Cited

U.S. PATENT DOCUMENTS

| | | | |
|---|---|---|---|
| 6,718,261 B2 | 4/2004 | Mattheyses et al. | |
| 7,236,861 B2 | 6/2007 | Paradis et al. | |
| 7,561,037 B1 | 7/2009 | Monroe | |
| 7,706,979 B1 * | 4/2010 | Herwitz | G01S 13/003 340/903 |

(Continued)

OTHER PUBLICATIONS

US Army, "Joint Land Component Constuctive Training Capatability-Entity Resolution Federation"; http://www.carson.army.mil/battle_sim/JLCCTC.htm [Retreived from internet Jun. 25, 2013].

(Continued)

*Primary Examiner* — Paulinho E Smith
(74) *Attorney, Agent, or Firm* — Lorenz & Kopf, LLP

(57) ABSTRACT

A system for planning and executing a response to an incident includes a planning and execution data source and a processing system. The processing system is in operable communication with the planning and execution database. The processing system is configured to generate pre-planned responses to be executed by associated response assets, store data representative of the pre-planned responses in the planning and execution database, selectively retrieve a pre-planned response from the planning and execution database, communicate with the response assets associated with the retrieved pre-planned response, provide real-time tracking of the retrieved pre-planned response being executed by the associated response assets, and selectively generate recommendations for modifying the retrieved pre-planned response.

20 Claims, 7 Drawing Sheets

(56) References Cited

U.S. PATENT DOCUMENTS

| | | | | |
|---|---|---|---|---|
| 8,639,214 B1* | 1/2014 | Fujisaki | ............... | H04M 11/007 |
| | | | | 379/88.03 |
| 2009/0077214 A1 | 3/2009 | Buster et al. | | |
| 2009/0216775 A1* | 8/2009 | Ratliff | .................... | G06Q 10/08 |
| 2012/0091259 A1* | 4/2012 | Morris | .................... | B64C 27/02 |
| | | | | 244/17.13 |
| 2013/0270394 A1* | 10/2013 | Downs | ................. | G05D 1/0027 |
| | | | | 244/76 R |
| 2014/0135588 A1* | 5/2014 | Al-Ali | ................... | G06F 19/327 |
| | | | | 600/300 |
| 2014/0166817 A1* | 6/2014 | Levien | ................. | B64C 39/024 |
| | | | | 244/190 |
| 2014/0222248 A1* | 8/2014 | Levien | ................. | B64C 39/024 |
| | | | | 701/2 |
| 2014/0277834 A1* | 9/2014 | Levien | ................. | B64C 39/024 |
| | | | | 701/2 |
| 2014/0351180 A1* | 11/2014 | Canoy | ................. | G06N 99/005 |
| | | | | 706/12 |
| 2015/0336667 A1* | 11/2015 | Srivastava | ............ | B64C 39/024 |
| | | | | 701/2 |
| 2015/0364028 A1* | 12/2015 | Child | ....................... | G08B 1/08 |
| | | | | 348/143 |
| 2016/0371470 A1* | 12/2016 | Prabhu | .................... | G06K 7/00 |

OTHER PUBLICATIONS

Lockheed Martin, "RendezView™ Collaboration Planning and Monitoring" Product Brochure, 2010.

Lt Col Nancy R. Trivett, "Air combat command concept of operations for theater battle management core systems"; http://www.fas.org/man/dod-101/usaf/docs/tbmcs/CON-OPS.html, Sep. 30, 1996.

\* cited by examiner

US 9,824,315 B2

RESPONSE PLANNING AND EXECUTION AIDING SYSTEM AND METHOD

TECHNICAL FIELD

The present invention generally relates to systems and methods to more effectively manage responses to various events, and more particularly relates to a system and method to aid in the planning and execution of responses to various events.

BACKGROUND

The addition of aerial, robotic or electronically controlled assets to a team of first responders such as a Special Weapons and Tactics (SWAT) team, Hazmat team can be a burden on operations requiring supplemental personnel to operate and manage the asset(s). The addition of these assets should be contemplated in advance and integrated within the team's current Concept of Operations (CONOPS) and should even absorb current CONOPS activities so as to provide more effective incident resolutions.

The integration of new assets into a common asset control for the incident commander is valued whether it is an aerial autonomous vehicle (UAV), a ground autonomous Unmanned Ground Vehicle (UGV), a canine (K9) team, a portable or stationary Unattended Ground Systems (UGS), manned emergency vehicles, a SWAT officer, or a fireman. Incremental functionality and integration with additional assets, including those from other teams that may join, without incremental burden is a prime objective.

Hence, there is a need for systems and methods to improve manned and autonomous asset association and coordination for overall incident management of team members, equipment, and remote payload sensors and systems for the location tracking of personnel and equipment, asset tracking and mission organizing of personnel and mission equipment. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An embodiment of a system for planning and executing a response to an incident includes a planning and execution data source and a processing system. The processing system is in operable communication with the planning and execution database. The processing system is configured to: (i) generate pre-planned responses to be executed by associated response assets, (ii) store data representative of the pre-planned responses in the planning and execution database, (iii) selectively retrieve a pre-planned response from the planning and execution database, (iv) communicate with the response assets associated with the retrieved pre-planned response, (v) provide real-time tracking of the retrieved pre-planned response being executed by the associated response assets, and (vi) selectively generate recommendations for modifying the retrieved pre-planned response.

Furthermore, other desirable features and characteristics of the system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
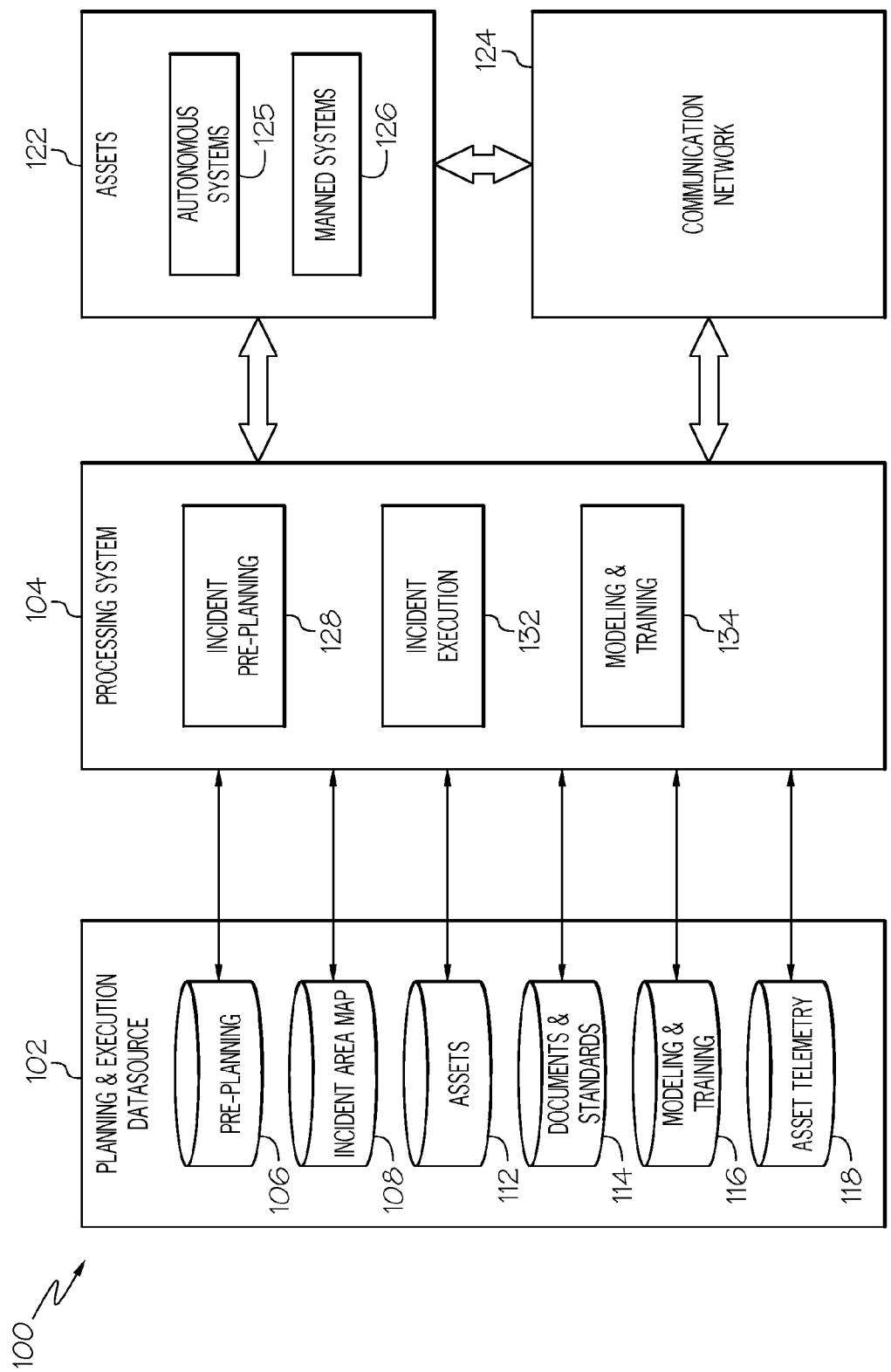
FIG. 1 depicts a functional block diagram of a response planning and execution system.
Figure 2:
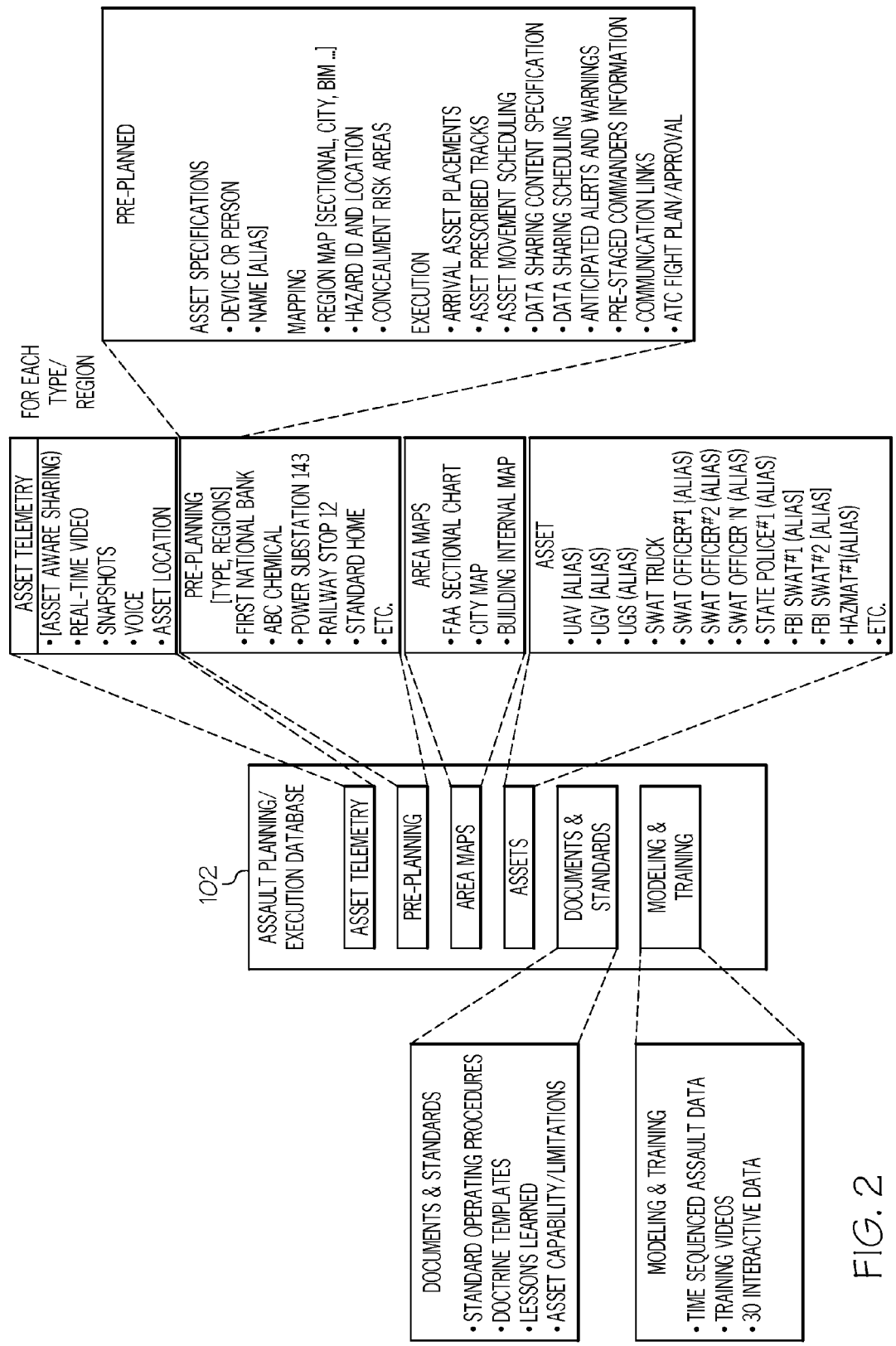
FIG. 2 one example of the contents of each of the databases that may be used to implement the system of FIG. 1.

Referring now to FIG. 1, a functional block diagram of a response planning and execution system 100 is depicted. The depicted system 100 includes a planning and execution data source 102 and a processing system 104. The planning and execution data source 102 includes plurality of databases. These databases include a pre-planned incident database 106, an incident area map database 108, an asset database 112, a document and standards database 114, a modeling and training database 116, and an asset telemetry database 118 that receives and stores telemetry, commands, messages, and sensor feeds. It will be appreciated that the databases may be implemented in one or a plurality of computational devices, and may be physically collocated or disposed at different locations. Non-limiting examples of the content of each of the databases is depicted in FIG. 2, and with reference thereto will now be briefly described.

The pre-planned incident database 106 has data stored therein that is representative of a plurality of pre-planned responses to be executed by associated response assets 122 (both personnel and equipment). The pre-planned responses may be categorized into various types and/or regions. For example, the pre-planned response database 106 may have pre-planned response data for responding to incidents at various environments, such as banks, industrial facilities, power stations or sub-stations, communication facilities, transportation facilities, and homes, just to name a few. For each of these environments, the pre-planned response data may also include data representative of the assets (both personnel and equipment) needed to implement the response, data representative of various maps that may be needed to implement the pre-planned response, and data representative of response execution.

The incident area map database 108 contains the maps of various areas, buildings, floor plans, etc. This database 108 may receive map and environmental updates over any of the communication networks 124 (described below). This includes environmental updates such as weather forecasts or chemical downwind messages. The processing system 104 accepts update information from the internet, intranet, or local sensors.

The asset database 112 includes data representative of the various assets, associated IDs, associated capabilities, and various other information types, such as linkage to other assets and assignments to other assets. These data can be variously provided. Some non-limiting examples include bar-codes, RFID tags, personnel and equipment tracking devices such as, for example, GPS, RFID, or dead reckoning modules (DRMs).

The documents and standards database 114 includes data representative of various standard operating procedures (SOPs) and response doctrine templates from pertinent textbooks, and from lessons learned. This database 114 may also include asset capability and limitation information. These data may be received and updated via any one of the communications networks 124.

The modeling and training database 116 includes data representative of time sequenced responses, training videos, three dimensional (3D) interactive data, and various other data that may be used to review and debrief prior responses, and/or validate new response plans.

The asset telemetry database 118 receives, and at least temporarily stores, data representative of real-time video, snapshots, voice, and location supplied from each of the assets 122.

Returning to FIG. 1, it is seen that the processing system 104 may be continuously or selectively in operable communication with various ones of the databases 106-118 in the planning and execution data source 102. The processing system 104 may also be continuously or selectively in operable communication with various assets 122 and one or more communications networks 124. The number and type of assets 122 may vary, and may include, for example, various unmanned autonomous systems 125 and various manned systems 126. The unmanned autonomous systems 126 may vary and may include, for example, one or more unmanned autonomous vehicles (UAVs), one or more unmanned ground vehicle (UGVs), various unmanned ground sensors (UGSs), and one or more surface/submersible systems, just to name a few. The manned systems 128 may also vary and may include, for example, a canine (K9) team, one or more manned emergency vehicles, one or more police officers, fire fighters, and/or other types of first-responders, just to name a few. Each asset 122 is preferably configured with its own computing, RF, and/or software to implement some form of wired or wireless connectivity to the processing system 104, either directly or via one or more of the communications networks 124.

The communications networks 124 provide various types of information and data to the processing system 104, and may also be used to provide communication between one or more of the assets 122 and the processing system 104. It will be appreciated that the communications networks 124 may vary and may include, for example, radio frequency (RF) communication networks, cellular networks, satellite communication networks, an intranet, the internet, or various combinations thereof, just to name a few.

Figure 3:
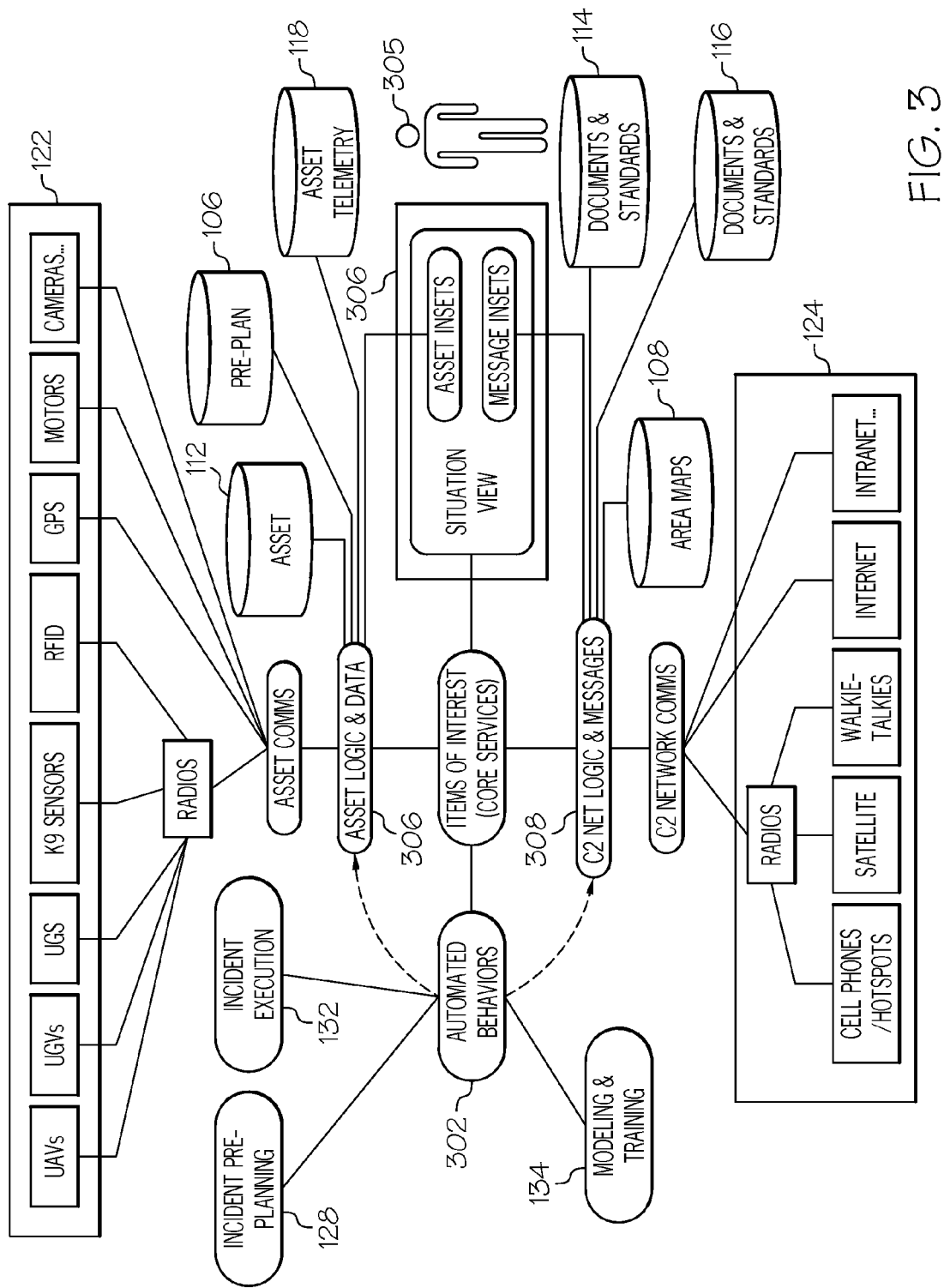
FIG. 3 depicts a simplified representation of various functional modules, systems, and sub-systems that may be used to implement the system of FIG. 1.

The processing system 104 is configured to implement three major functions. These functions include an incident pre-planning function 128, an incident execution function 132, and a modeling and training function 134. Each of these major functions 128-134 may be implemented in software, hardware, firmware, or various combinations thereof and, as noted above, may be installed partially or wholly on one or more individual devices. As depicted more clearly in FIG. 3, each of these major functions 128-134 intercommunicate with an automated behaviors function 302, asset logic 304, and command and control (C2) network logic functions 304. These major functions 128-134 selectively retrieve data from and store data to the databases 106-118, supply information to and receive information from a user 305 via a user interface 306, and receive information from and supply information to the various assets 122 and the communication networks 124. Each of the major functions 128-134 will now be described in more detail, beginning with the incident pre-planning function 128.

The incident pre-planning function 128 selectively retrieves data from and/or supplies data to the pre-planned incident database 106, the incident area map database 108, the asset database 112, the document and standards database 114, and the modeling and training database 116. The incident pre-planning function 128 is also configured to be in operable communication with various ones of the previously mentioned assets 122 and the user interface 306. The incident pre-planning function 128 is used to plan, in advance, responses to various incidents. More specifically the incident pre-planning function 128 allows users, such as incident response planners and/or commanders, to pre-plan responses to various types of incidents at various locales. The incident pre-planning function 128 stores the pre-planned incident responses for various incidents in the pre-planned incident database 106. Over time, and as incidents are responded to, users can create and update incident response plans for various locations and anticipated events in their area of operations. When the processing system 104 is not connected to actual assets 122, the modeling and training database 116 can be used to support in-office planning or on-site mission rehearsal. This capability alleviates the need to connect to the various assets 122 while developing response plans, since, as will be described momentarily, the incident pre-planning function 128 will generate recommendations regarding plan build-up with or without connection to actual assets 122.

In addition to the above, a user 305 can use the incident pre-planning function 128 upon arriving at a training or actual incident. For example, the user 305 can retrieve an appropriate pre-planned response from the pre-planned response database 106, and use the retrieved response as a starting point for the training or actual incident. While the incident response is being executed, the processing system 104, via for example, an RF control device (RFCD) 412 (FIG. 4) will connect to live elements and/or some combination of simulated elements. This live/simulated capability will provide the user 305 with the ability to try different scenarios or even plan, in real-time, for live event changes such as upcoming crew shift-changes or for other events such as another agency arriving to help with the response. In the field during live events (real or training), there is a fine line between pre-planning and execution, and the incident pre-planning function 128 transitions seamlessly between the planning and execution phases and provides information sharing with the incident execution function 132. The incident pre-planning function 128 also works seamlessly with the assault modeling and training function 134 to support in-office planning without having to connect to live assets and to support real-time planning updates during the live event.

Figure 4:
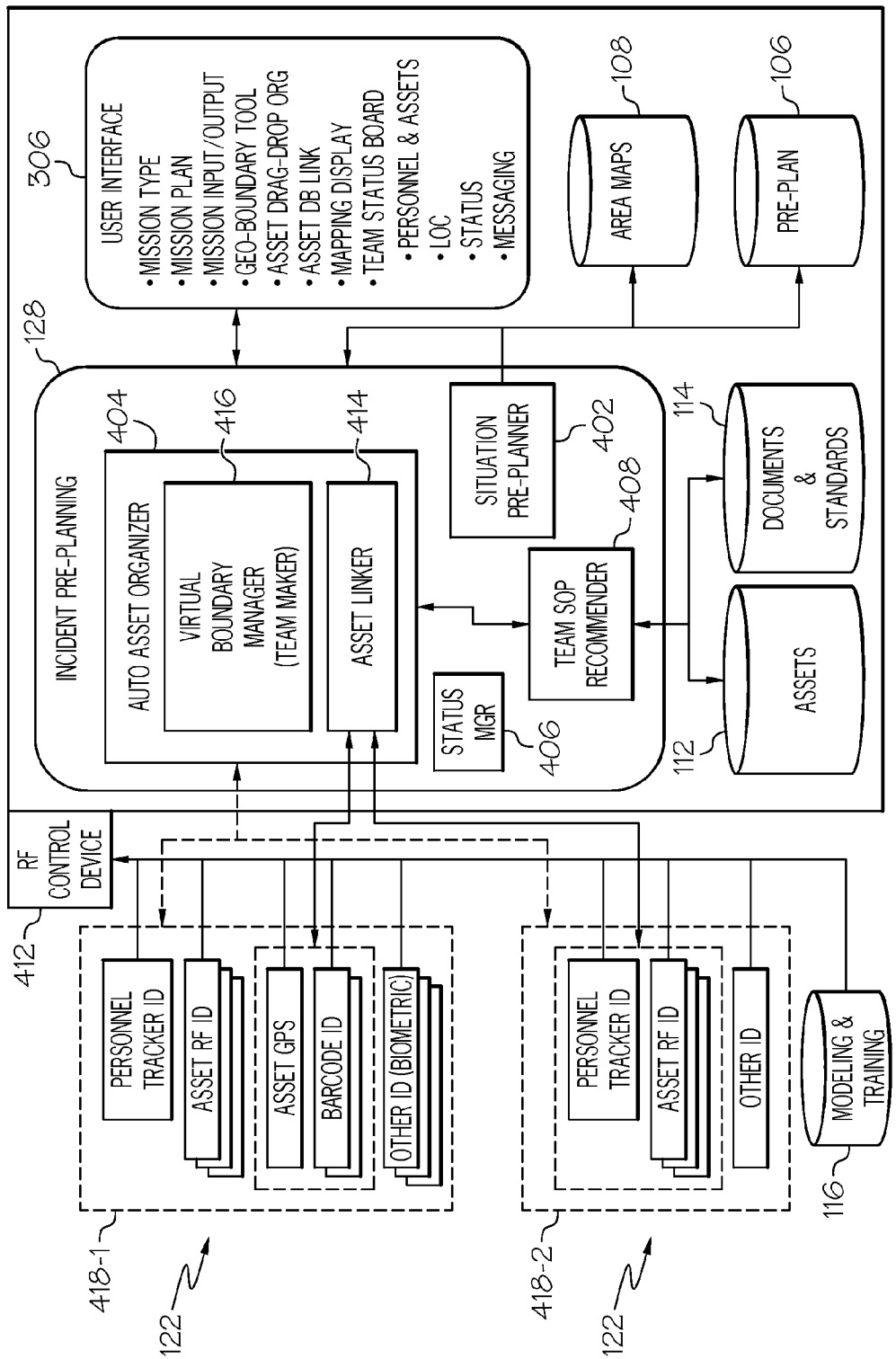
FIG. 4 depicts a functional block diagram representation of an incident pre-planning function.

To implement the above-described functionality, and as shown more clearly in FIG. 4, the incident pre-planning function 128 is configured to implement a situational pre-planner (SPP) 402, an auto asset organizer (AAO) 404, a status manager (SM) 406, and a team SOP (standard operating procedure) recommender (TSR) 408. These functions, which will now be described in more detail, provide the user 305 (such as an incident commander) with automated tools to rapidly assist in planning responses, assembling response-appropriate assets 122, and checking the status of those response-appropriate assets 122.

The SPP 402 is configured to selectively retrieve data from the pre-planned incident database 106. In particular, the SPP 402 is configured to retrieve a list of previously created responses from the pre-planned incident database 106 for display on the user interface 306. The user 306 may then select one of the previously created responses to use as a starting point for the AAO 404.

The AAO 404 is configured, upon selection of one of the pre-planned responses retrieved by the SPP 402, to assemble the correct assets 122 from all of the available assets, and based on expertise supplied from the documents and standards database 114. The AAO 404 uses asset identifiers stored in the asset database 112. The assets 122 may be anything or anyone the user 305 believes he/she may need to complete the mission. When any asset links with the RFCD 412, the system records the asset in the assets database 112.

The AAO 404 is additionally configured to implement an asset linker (AL) 414 and a virtual boundary manager (VBM) 416. The AL 414 is configured to selectively tie together various assets 122 that may not be configured with the ability to self-identify or self-locate. For example, if an individual member of a response team has a standalone camera, the user 305 can place a barcode on the camera, scan it, and then use the AL 414 to link it to the individual team member and his/her GPS, DRM tracker, or any other asset 122 to make the camera a "smarter" sensor that can now report its location and time along with the video feeds. The VBM 416 allows the user 305, via the user interface 306, to graphically draw and label a virtual team boundary 418. In the example depicted in FIG. 4, two team boundaries 418 (e.g., 418-1, 418-2) have been drawn and labeled.

The SM 406 is configured to receive messages, status, and events from the each of the assets 122 that are in operable communication with the processing system 104, and to maintain an on-going status chart of the assets 122 for display on the user interface 306. The SM 406 works in conjunction with a logging function implemented in the RFCD 412, and with the asset database 112 to track the cumulative time each asset 122 has logged during the incident response and other events such as environmental exposure. The SM 406 also works in conjunction with the incident execution function 132 (described below) to generate alerts regarding recommended shift-changes, equipment changes, and/or refreshes (such as it being necessary to charge specific battery packs, change chemical filters, or the like). The SM 406 is additionally configured to transmit asset 122 and response information (Such as the instrumented mission elements including: who, where, when, what, sensor logs, and the non-instrumented aspects such as the Commander's expert determination of why the various events happened during the mission) to the assets database 112 to support training records, future training events and training needs, post-incident forensics analysis, etc.

The TSR 408 is configured to generate recommendations for the user 305. To do so, the TSR 408 implements the primary rule engine for comparing information in the incident area map database 108, the asset database 112, the documents and standards database 114, and data supplied from the SM 406 to generate recommendations and alerts. The TSR 408 is configured to compare all of the available assets 122 within each group to the "textbook" guidance provided in the documents and standards database 114. The TSR 408, based on this guidance, will then make recommendations to the user 305 regarding any changes in the asset 122 composition, including identifying any capabilities or equipment not present and provide alerts to the user 305 via the user interface 306. The TSR 408 is also configured to generate recommendations regarding assets 122 that may be present, but not normally needed to satisfy the capability requirements of the selected pre-planned incident response. Thus identifying and offering potential weight or complexity saving for the Commander.

The user interface 306 provides I/O screens, icons, and controls, such as joysticks, for the user 305 to receive alerts, status, and recommendations from the incident pre-planning function 128. The user 305, via functions implemented in the user interface 306, may input initiation information to the incident pre-planning function 128 to begin coordinating response teams, assets, and SOP/tactics based recommendations to the user 305.

The primary functions implemented in the user interface 306 include response plan retrieval from the pre-planned response database 106, drawing or selecting geographic boundaries using VBM 416, an asset drag-and-drop organization chart tool, and a team status board display. The asset drag-and-drop organization chart tool may be used to make manual team selections, create or approve AL 414 recommendations, create or approve TSR 408 recommendations, modify existing asset configurations based on SM 406 updates, alerts, or as a result of shift changes or new team members arriving on scene.

The team status board display, based on information from the SM 406, provides a near-real-time listing of the assets 122 that are assigned to specific teams and responses. This function also provides status and locations of assets 122 assigned to specific personnel or to the overall response plan. The team status board display also works with the incident execution function 132 to support asset messaging and controls. The team status board display function also outputs information to the modeling and training function 134 to support training, audits, and litigation efforts. This provides the commander with an at-a-glance status, locations, and events of all assets in the current mission.

To assemble a response team using the incident pre-planning function 128, the user 305 uses the user interface 306 to: 1) select the response type from a pull-down menu (i.e. building assault); 2) select a typical team configuration from the document and standards database 114 that best matches the current situation or pull from previous plans and configurations from the pre-planned response database 106; and 3) graphically draw and label a team boundary 418 on the map display from the incident area map database 108 loaded in his computer. He does this for each team as recommended by the TSR 408.

When an asset 122 stored in the assets database 112 enters a virtual team boundary 418, the asset 122 is automatically associated with that team's group label. The user interface 306 will display the assets 122 in each group and the associated capabilities and all equipment associated with those individuals.

The user 305 can then use an asset drag-and-drop tool in the user interface 306 to make the team changes, and to send a request to other users 305 or Higher Headquarters for assets required to fill his system-identified gaps. Once the teams have been configured, the user 305 can manage assets 122 as they come and go to the response location. This will support shift changes, other organizations showing up to help, or other events that change the make-up of the team. This can also include mission changes. The user can use barcodes or RFID tags with the AL 414 to rapidly join new assets 122 the asset database 112 and to the dynamically changing team groupings.

Figure 5:
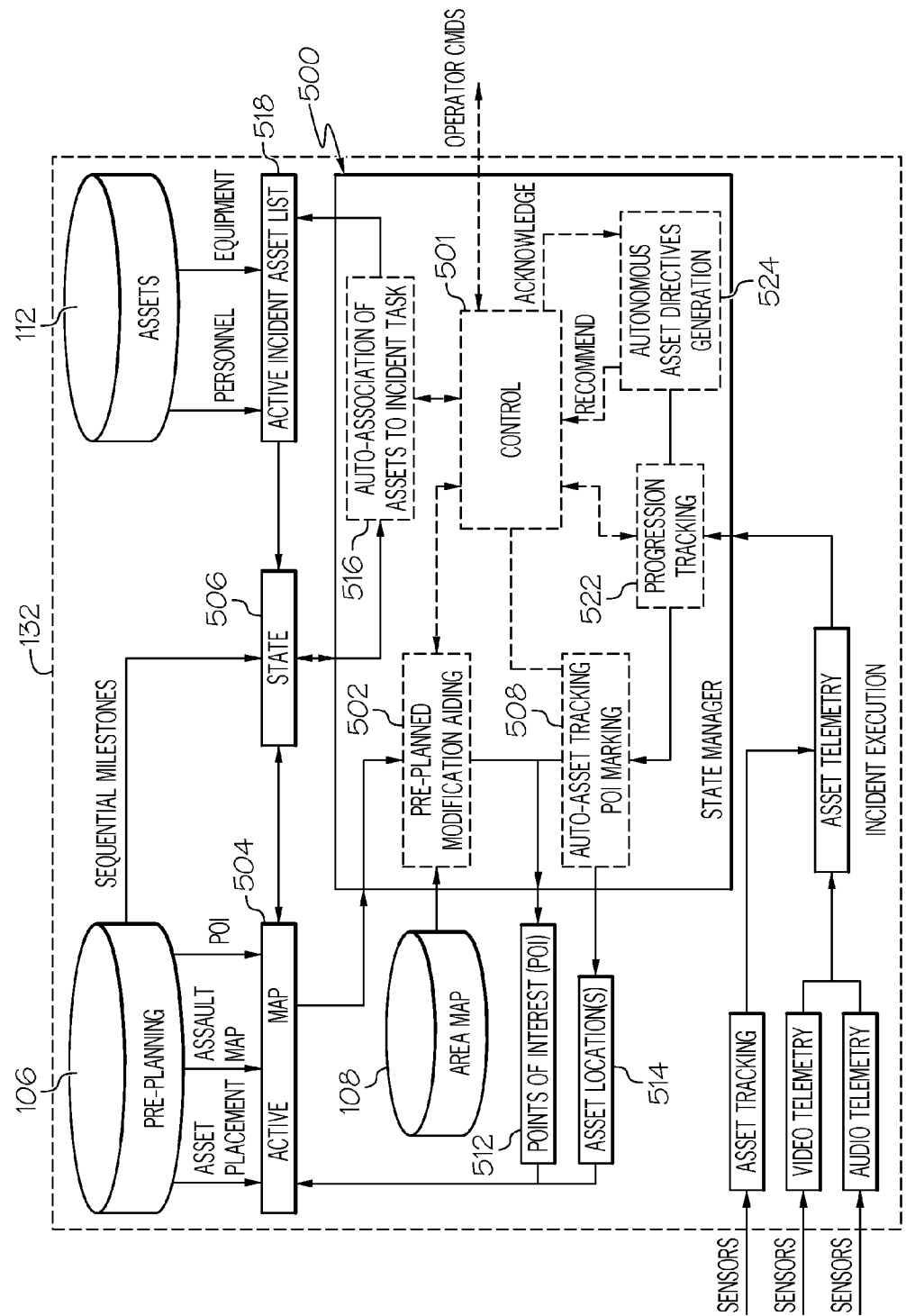
FIG. 5 depicts a functional block diagram of an incident execution function.
Figure 6:
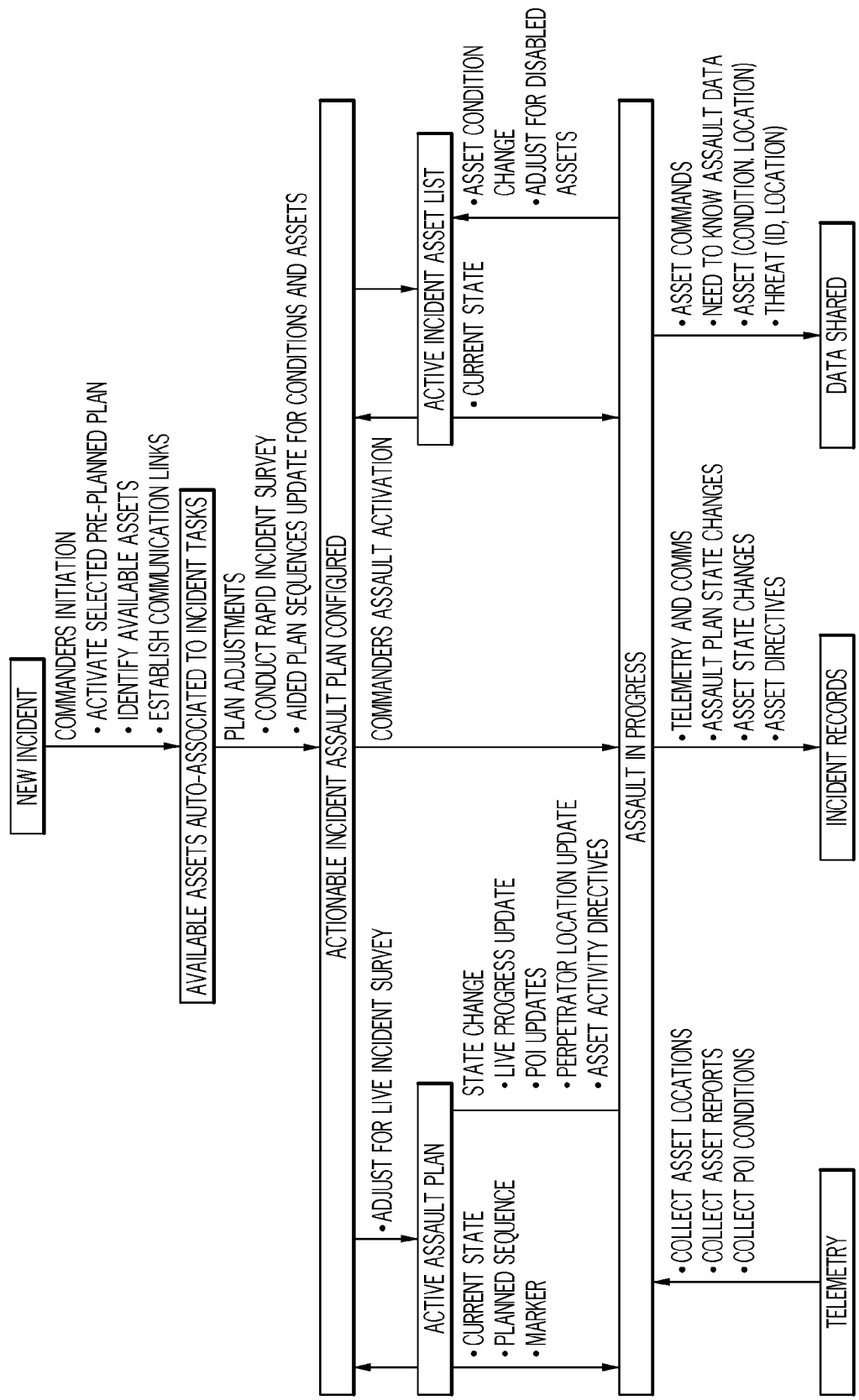
FIG. 6 depicts a state diagram of the operations implemented within a control function of the incident execution function.

The incident execution function 132 is used to execute a selected pre-planned response and to adjust the pre-planned response, as necessary, in real-time. To do so, the incident execution function 132 implements a response state manager. The response state manager 500, which is depicted more clearly in FIG. 5, implements various elements. The response state manager 500 receives data from three of the databases—the pre-planned response database 106, the incident area map database 108, and the asset database 112. The response state manager 500 also receives real-time live data from the various sensors associated with various assets 122, and user input commands from the user interface 306. The control and data flow between the various elements implemented in the response state manager 500, the databases 106, 108, 112, and the real-time data sources, is managed via a control function 501. For completeness, a state diagram of the operations implemented within the control function 501 is provided, and is depicted in FIG. 6. Moreover, with reference to FIGS. 5 and 6, the control and data flow between the various elements implemented in the response state manager 500, the databases 106, 108, 112, and the real-time data sources will now be described.

An actual incident response is initiated by the user 305 (e.g., a commander) before he/she arrives at the scene, and preferably while en route to the incident scene. Based on the location and initial reports of the incident, the user 305 can retrieve a pre-planned response from the pre-planned response database 108 that best matches the reported incident (i.e., hostage barricade in a bank, chemical fire in a factory, etc.). This is accomplished via a pre-planned incident modification aiding function 502, which uses an active incident area map 504 that was retrieved from the incident area map database 108, and sequential milestone data supplied from the pre-planned incident database 106, to begin establishing an active response state 506. Moreover, in preparation for the response, an auto-asset tracking POI marking function 508 is configured to generate POIs (points of interest) 512 on the active incident area map 504 and, as the user 305 deems necessary, to adjust asset locations 514. The system will also automatically suggest pre-planned incident plans associated with the location of the commander when he activates the system outside of the home office.

The incident execution function 132 is additionally configured to generate and display a list of desired assets 122 and to initiate an automated call to the desired assets 122 for assistance and desired arrival time at the incident location. Various assets 122 respond, via one or more of the communications networks 124, regarding the ability to comply with the requests, thereby allowing the user 305 the opportunity to adjust the response plan based on availability and capability of each asset 122. This process continues upon arrival at the scene, as the assets 122 arrive and local communication links are established as the assets 122 are identified. This is managed via an auto-association of assets to incident task function 516, which adjusts an active incident asset list 518.

With all the preparations in place, the user 305 may initiate the incident response based on the pre-planned, adjusted as necessary, sequential milestones 506. A response progression tracking function 522 continuously updates the location of the assets 122, and continuously supplies data representative thereof to the auto-asset tracking POI marking function 508. As the response progresses through the pre-planned stages, an autonomous asset directives generation function 524 generates alerts to be supplied to the user 305 regarding next events, asset deviations, and also provides the user with a click-on-send function (re-position ground asset, re-position aerial asset, place intrusion sensor in a cleared room, command a human assault team to move forward). The click-on-send function also allows for critical information sharing (perpetrator location update, explosive fuel hazard, and perpetrator and/or victim photographs). This information is automatically shared on as needed basis (i.e. only the team about to encounter an explosive fuel hazard needs the alert; however, all personnel would receive photos and number of the perpetrator(s)).

Figure 7:
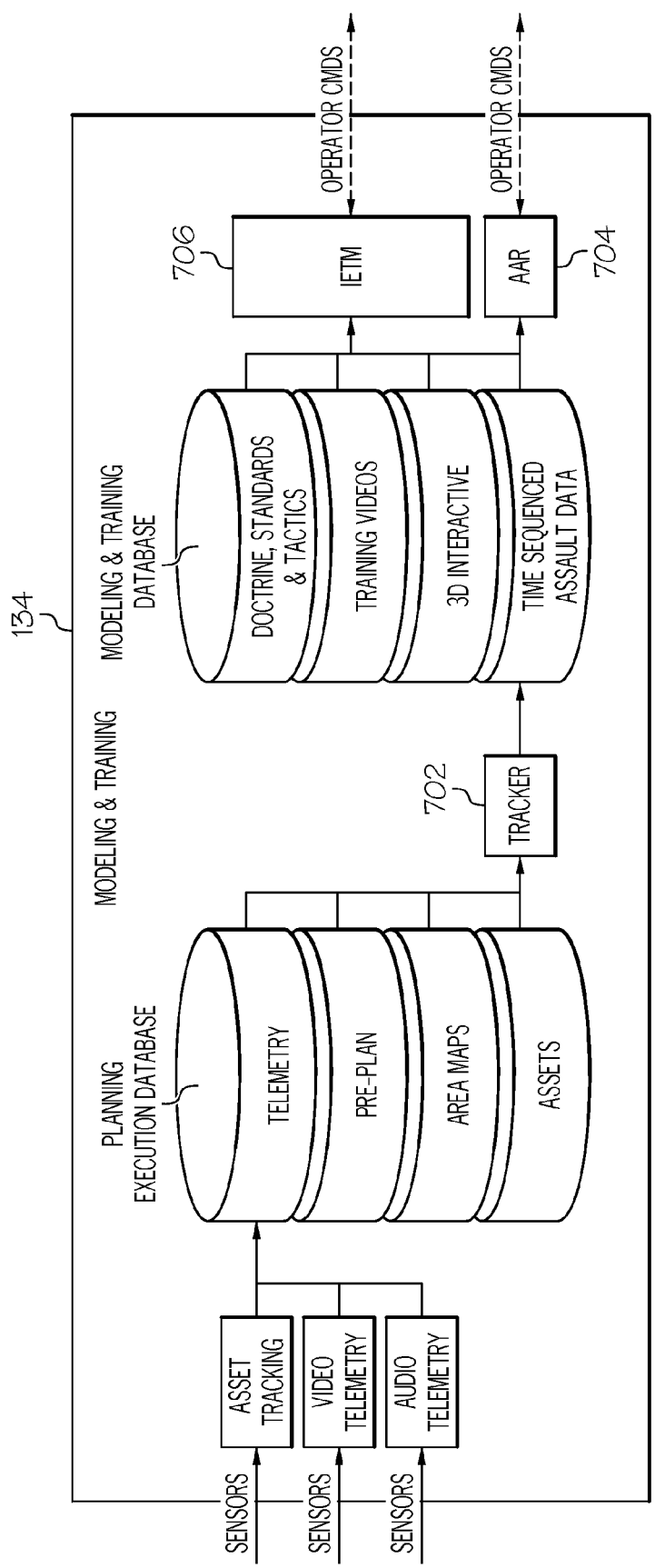
FIG. 7 depicts a functional block diagram of modeling and training function.

The modeling and training function 134 may be used to test the pre-planned responses and to assess actual responses upon completion. As depicted in FIG. 7, the modeling and training function 134 implements a response tracker function 702, an after action review (AAR) function 704, and an IETM (interactive electronic technical manual) function 706. Each of these functions are used for various training activities including, but not limited to, response plan training, incident arrival training, incident execution training, AAR, offline embedded training, and failure insertion training (asset doesn't show up, asset fails, etc.).

The response tracker function 702 implements two major functions: data collection and data fusion and storage. The response tracker function 702 collects data transmitted to the asset telemetry database 118 from the various assets 122. These data may be transmitted either directly from the assets 122 via wireless communication (Wi-Fi, 3G, 4G, etc.), various radio communications, or through Ethernet connectivity. The response tracker function 702 securely embeds time tags within the data in order to maintain data integrity. This may be accomplished by, for example, digitally embedding time in collected audio streams, video streams, or images, or by encrypting all of the data into a read only format.

The data fusion functionality of the response tracker function 702 combines the data from the various assets and aligns these to the respective timeline in a similar fashion to a video/audio media editor. This functionality will additionally organize the collected data into an appropriate timeline and data format (e.g., video_20120713_113029.mp4, audio_20120713_113315.mp3, pic_20120713_120145.jpg) prior to storage in the modeling and training database 116. This provides easy access to, and addition of, data in the modeling and training database 116 for use by the AAR function 704.

The AAR function 704 is configured similar to a video and audio editor in that it can combine various videos, images, and audio into a single stream. Using the AAR function 704, the operator 305 can select each file to include in a project using a drag-and-drop functionality. There can be multiple lines of video and audio included within the project. Because, as noted above, the data are time sequenced, the operator 305 can construct and combine a timeline from the data within the modeling and training database 116. The AAR function 704 may also be used to time sequence snapshots and combine the video and images from four or more sources, limited only by screen size availability. The operator 305 can select various audio sources to be matched with events. The operator can also change sources and repeat the timeline to be able to re-emphasize a particular action or event from a different perspective, either audio or video. The operator 305 can add shapes, pointers, text or various overlays to highlight or point out key observations or zoom in on a key component of the scenario.

The IETM function 706 is configured to allow an author to tailor the construction to of an IETM to a specific asset or response. Tailoring an IETM to a specific asset or response provides the user 305 with the option of including or excluding such things as training, technical information, maintenance information, operations, movies, 3D interactions, documentation, graphics, pictures, tables, etc. This provides the author with the ability to easily load the desired files into a database, where the files would be translated into the IETM framework language. A constructor can then be used to organize the database structure. Once an IETM has been constructed, the user 305 can make the necessary changes to its look and feel.

As may be clear from the above, there are overlaps within each of the three major functions implemented in the processing system 104. For example, assignment of assets 122 via the incident pre-planning function 128 may also be used during implementation of the incident execution function 132 to complete a response team when various assets 122 arrive. The incident pre-planning function 128 may also use the modeling implemented in the assault modeling and training function 134 to test and validate various response plans.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for planning and executing a response to an incident, comprising:
    a planning and execution data source, the planning and execution database comprising a pre-planned response database, an area maps database, an asset database, a documents and standards database, a modeling and training database, and a telemetry database; and
    a processing system in operable communication with the planning and execution data source, the processing system configured to:
        (i) generate pre-planned responses to be executed by associated response assets,
        (ii) store data representative of the pre-planned responses in the planning and execution database;
        (iii) selectively retrieve a pre-planned response from the planning and execution database,
        (iv) communicate with the response assets associated with the retrieved pre-planned response,
        (v) provide real-time tracking of the retrieved pre-planned response being executed by the associated response assets, and
        (vi) selectively generate recommendations for modifying the retrieved pre-planned response.

2. The system of claim 1, wherein the pre-planned response database comprises data representative of a plurality of pre-planned responses to be executed by the associated response assets.

3. The system of claim 1, wherein the area maps database comprises data representative of various areas, buildings, and floor plans.

4. The system of claim 1, wherein the asset database comprises data representative of various assets.

5. The system of claim 1, wherein the documents and standards database comprises data representative of standard operating procedures.

6. The system of claim 1, wherein the modeling and training database comprises data representative of prior responses.

7. The system of claim 1, wherein the telemetry database comprises data representative of telemetry, commands, messages, and sensor feeds.

8. The system of claim 1, further comprising:
    a user interface in operable communication with the processing system and configured to selectively render and implement one or more I/O screens, icons, and controls.

9. A system for planning and executing a response to an incident, comprising:
    a planning and execution data source; and
    a processing system in operable communication with the planning and execution data source, the processing system configured to:
        (i) generate pre-planned responses to be executed by associated response assets,
        (ii) store data representative of the pre-planned responses in the planning and execution database;
        (iii) selectively retrieve a pre-planned response from the planning and execution database,
        (iv) communicate with the response assets associated with the retrieved pre-planned response,
        (v) provide real-time tracking of the retrieved pre-planned response being executed by the associated response assets,
        (vi) selectively generate recommendations for modifying the retrieved pre-planned response, and
        (vii) implement an incident pre-planning function, an incident execution function, and a modeling and training function.

10. The system of claim 9, wherein the incident pre-planning function is configured to:
    generate the pre-planned responses to be executed by associated response assets; and
    store the data representative of the pre-planned responses in the planning and execution database.

11. The system of claim 10, wherein the incident preplanning function implements a situational pre-planner, an auto asset organizer, a status manager, and a team standard operating procedure recommender (TSR).

12. The system of claim 11, wherein the situational pre-planner is configure to retrieve a list of previously created responses from the planning and execution data source for display on a user interface.

13. The system of claim 12, wherein the auto asset organizer is configured, upon selection of one of the pre-planned responses retrieved by the situational pre-planner, to assemble correct assets from all available assets.

14. The system of claim 13, wherein:
    the auto asset is further configured to implement an asset linker (AL) and a virtual boundary manager (VBM);
    the AL is configured to selectively tie together various assets 122 that may not be configured with the ability to self-identify or self-locate; and
    the VBM is configured to allow a user, via a user interface, to graphically draw and label a virtual team boundary.

15. The system of claim 11, wherein the status manager is configured to:
    receive messages, status, and events from the each assets that is in operable communication with the processing system; and
    maintain an on-going status chart of the assets for display on a user interface.

16. The system of claim 11, wherein the TSR is configured to implement a primary rule engine to information in the planning and execution data source to generate recommendations and alerts.

17. The system of claim 9, wherein the incident execution function is configured to selectively retrieve the pre-planned response from the planning and execution database, communicate with the response assets associated with the retrieved pre-planned response, provide real-time tracking of the retrieved pre-planned response being executed by the associated response assets, and selectively generate recommendations for modifying the retrieved pre-planned response.

18. The system of claim 17, wherein the incident execution function is additionally configured to:
    generate and display a list of desired assets; and
    initiate an automated call to the desired assets.

19. The system of claim 9, wherein the modeling and training function is configured to test the pre-planned responses and to assess actual responses upon completion thereof.

20. The system of claim 9, further comprising:
a user interface in operable communication with the processing system and configured to selectively render and implement one or more I/O screens, icons, and controls.

* * * * *